US011131858B2

(12) United States Patent
Cheng et al.

(10) Patent No.: US 11,131,858 B2
(45) Date of Patent: Sep. 28, 2021

(54) LOW-HEIGHT PROJECTOR ASSEMBLY

(71) Applicant: OmniVision Technologies, Inc., Santa Clara, CA (US)

(72) Inventors: Tingyu Cheng, New Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 387 days.

(21) Appl. No.: 16/155,833

(22) Filed: Oct. 9, 2018

(65) Prior Publication Data

US 2020/0110273 A1 Apr. 9, 2020

(51) Int. Cl.
*G02B 27/09* (2006.01)
*G02B 27/42* (2006.01)
*G06K 9/00* (2006.01)

(52) U.S. Cl.
CPC ..... *G02B 27/0955* (2013.01); *G02B 27/4238* (2013.01); *G06K 9/00255* (2013.01)

(58) Field of Classification Search
CPC ............ G02B 27/0955; G02B 27/4238; G02B 13/16; G02B 5/18; G06K 9/00255
USPC ......................................................... 359/558
See application file for complete search history.

(56) References Cited

U.S. PATENT DOCUMENTS

| 10,175,493 B1* | 1/2019 | Chen ................... G02B 27/0955 |
| 2010/0039822 A1 | 2/2010 | Bailey |
| 2016/0007008 A1 | 1/2016 | Molgaard et al. |
| 2017/0059971 A1* | 3/2017 | Takano ................ G03B 21/142 |

* cited by examiner

*Primary Examiner* — Marin Pichler
*Assistant Examiner* — Henry A Duong
(74) *Attorney, Agent, or Firm* — Lathrop GPM LLP

(57) ABSTRACT

A low-height projector assembly includes a biconvex lens, a converging lens, an aperture stop, and a beam-steerer between the biconvex lens and the converging lens. The biconvex lens has a principal plane, a focal length, and a first optical axis. The converging lens has a second optical axis laterally offset from the first. The beam-steerer is configured to steer light from the biconvex lens to the converging lens. An aperture-stop plane intersects the second optical axis and the aperture stop. On the second optical axis, at least one of a front surface and a back surface of the converging lens is between the aperture-stop plane and the beam-steerer. The axial chief ray's propagation distance from the principal plane to the aperture stop differs from the focal length by less than half the depth of focus of the biconvex lens.

13 Claims, 4 Drawing Sheets

| surface/plane | radius of curvature, mm | thickness, mm | refractive index | semi-diameter mm | conic | 4th order term | 6th order term | 8th order term | 10 order term | 12th order term |
|---|---|---|---|---|---|---|---|---|---|---|
| surface 212F | 1.110304481 | 0.281 | 1.522 | 0.678 | -0.8937522 | -0.107629993 | 0.744503578 | -2.481460657 | 5.9937 | -4.178764715 |
| plane 205 |  | 0.257 | 1.522 | 0.663 | 0 | 0 | 0 | 0 | 0 | 0 |
| surface 218B | 1.873028823 | 0.852 | 1.522 | 0.566 | -1.5712419 | -0.166898454 | 0.705467667 | -0.927997561 | 5.0443 | 0.859136057 |
| surface 223 |  | 0 | mirror | 0.765 | 0 | 0 | 0 | 0 | 0 | 0 |
| distance 237 |  | 1.550 |  | 0 | 0 | 0 | 0 | 0 | 0 | 0 |
| surface 224 |  | 0.000 | mirror | 0.470 | 0 | 0 | 0 | 0 | 0 | 0 |
| distance 238 |  | 0.500 |  | 0 | 0 | 0 | 0 | 0 | 0 | 0 |
| surface 311 | 45.0500292 | 0.043 | 1.589 | 0.233 | 817.6256469 | -0.070495926 | -85.04 | 4393.400204 | -3.7720E+04 | 0 |
| surface 321 |  | 0.200 | 1.517 | 0.227 | 0 | 0 | 0 | 0 | 0 | 0 |
| surface 322 |  | 0.037 | 1.511 | 0.197 | 0 | 0 | 0 | 0 | 0 | 0 |
| surface 332 | -1.64124342 | 0.525 |  | 0.192 | -534.6203096 | -12.495435175 | 328.046481253 | 4857.644990 | -1.1590E+05 | 0 |
| plane 202 |  | 0 |  | 0.113 | 0 | 0 | 0 | 0 | 0 | 0 |

LOW-HEIGHT PROJECTOR ASSEMBLY

BACKGROUND

Mobile devices are increasingly employing face recognition as a user authentication method with potentially enhanced security compared to other methods, such as passcodes and finger prints. One method of face recognition includes projecting structured infrared illumination on the face of the person trying to access the device. Since a mobile device's slimness partly determines its marketplace success, addition of the projection hardware should not significantly increase the thickness of the mobile device.

SUMMARY OF THE EMBODIMENTS

A low-height projector assembly includes a biconvex lens, a converging lens, an aperture stop, and a beam-steerer located between the biconvex lens and the converging lens. The biconvex lens has a principal plane, a focal length with respect thereto, and a first optical axis. The focal length has an associated depth of focus. The converging lens has a second optical axis laterally offset from the first optical axis. The beam-steerer is configured to steer light from the biconvex lens to the converging lens such that an axial chief ray, propagating from an object plane through the biconvex lens and along the first optical axis toward the beam-steerer, propagates along the second optical axis toward the converging lens. The aperture stop is intersected by an aperture-stop plane that intersects the second optical axis. On the second optical axis, at least one of a front surface and a back surface of the converging lens is between the aperture-stop plane and the beam-steerer. A propagation distance of the axial chief ray from the principal plane to the aperture stop differs from the focal length by less than half the depth of focus, such that the low-height projector assembly is one-sided telecentric.

A structured-light projector that includes a diffractive optical element, a light source, and a projector assembly. The diffractive optical element is configured to produce structured illumination from illumination incident thereon. The light source is configured to generate the incident illumination. The projector assembly is (i) located at least partially between the light source and the diffractive optical element, (ii) one-sided telecentric proximate the diffractive optical element, and (iii) configured to project the incident illumination onto the diffractive optical element.

A structured-light projector includes a diffractive optical element, a light source, and a projector assembly. The diffractive optical element is configured to produce structured illumination from illumination incident thereon. The light source is configured to generate the incident illumination. The projector assembly is (i) located at least partially between the light source and the diffractive optical element, (ii) one-sided telecentric proximate the diffractive optical element, and (iii) configured to project the incident illumination onto the diffractive optical element.

BRIEF DESCRIPTION OF THE FIGURES

FIG. 5 shows a second table of exemplary parameters of the low-height projector assembly of FIG. 2.

DETAILED DESCRIPTION OF THE EMBODIMENTS

Figure 1:
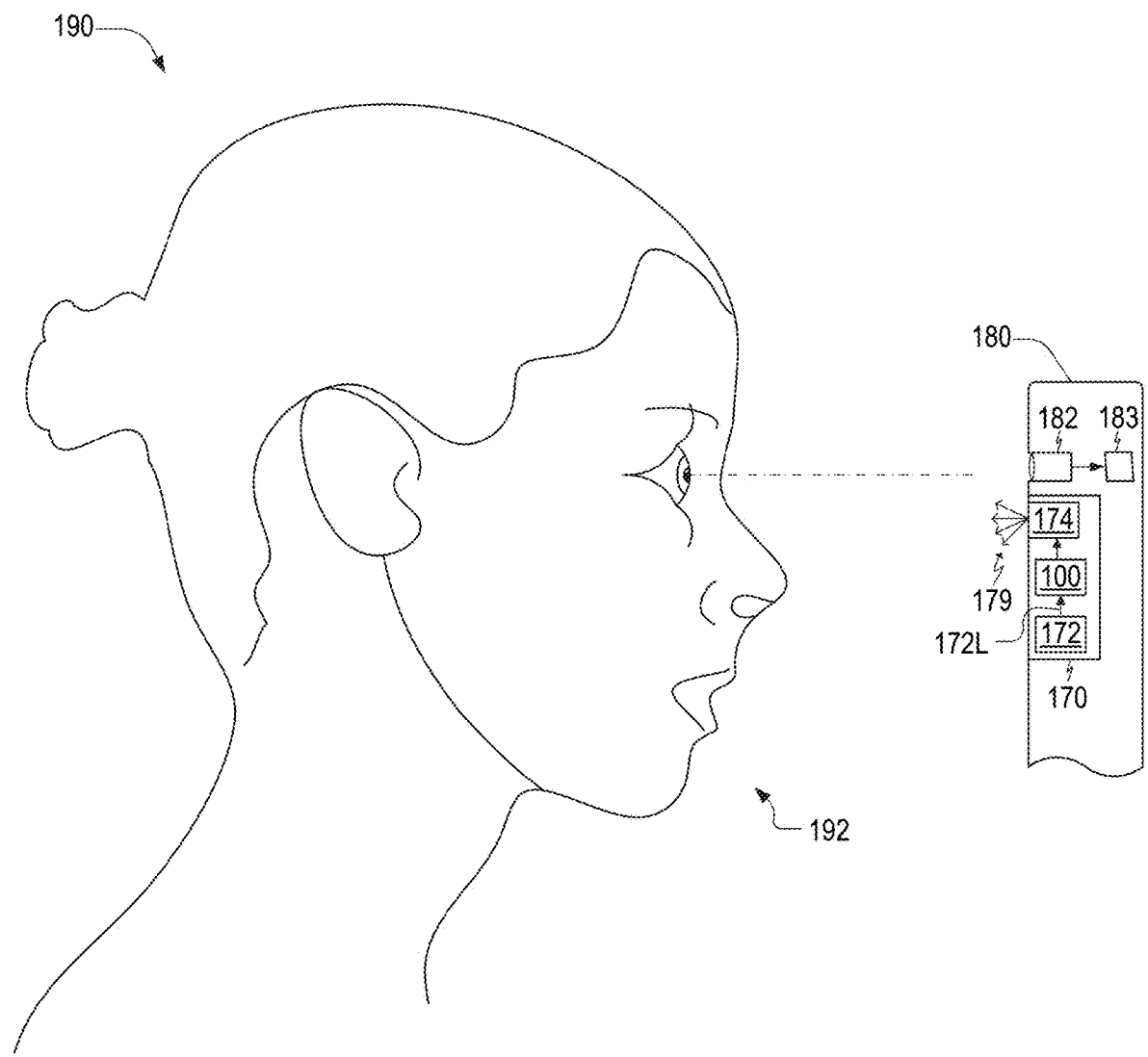
FIG. 1 illustrates a low-height projector assembly in an exemplary use scenario as part of a structured-light projector of a mobile device, in an embodiment.

FIG. 1 illustrates a low-height projector assembly 100 in an exemplary use scenario as part of a structured-light projector 170 of a mobile device 180. Structured-light projector 170 includes a light source 172, a diffractive optical element 174, and low-height projector assembly 100. Mobile device 180 also includes a camera 182. Light source 172 may be a vertical-cavity surface-emitting laser (VCSEL).

Low-height projector assembly 100 projects light 172L emitted by light source 172 to diffractive optical element 174, which produces structured illumination 179 that propagates a face 192 of a subject 190. Face 192 is in a field of view of camera 182, such that camera 182 may capture an image 183 of face 192 with structured illumination thereon. Image 183 may be stored within a memory of mobile device 180. In one exemplary use scenario, mobile device 180 processes image 183 to determine if subject 190 should be allowed access to mobile device 180.

Figure 2:
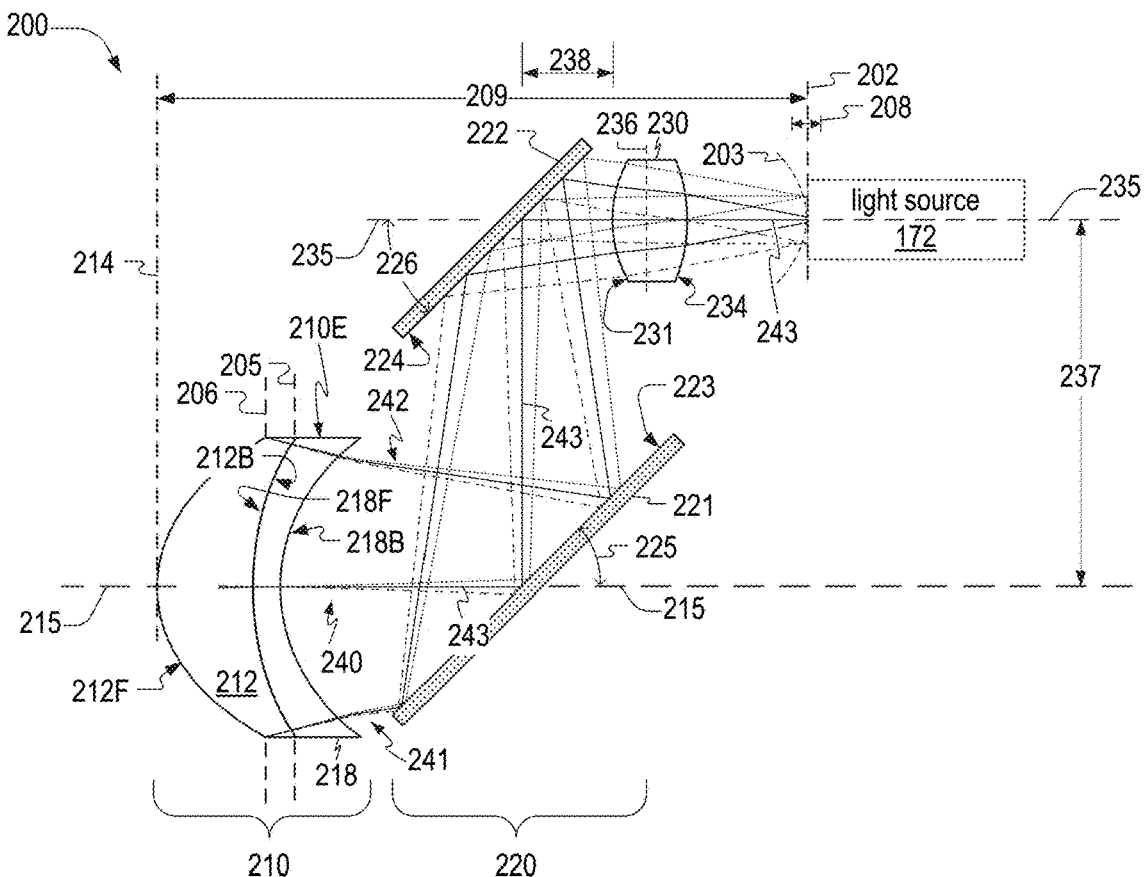
FIG. 2 is a schematic cross-sectional view of a low-height projector assembly, which is an embodiment of the low-height projector assembly of FIG. 1, in an embodiment.

FIG. 2 is a schematic cross-sectional view of a low-height projector assembly 200, which is an embodiment of low-height projector assembly 100 of FIG. 1. Low-height projector assembly 200 includes a converging lens 210, a biconvex lens 230, and a beam-steerer 220 therebetween.

Converging lens 210 has an optical axis 215 and may include a positive lens 212 and a negative lens 218, each of which may be meniscus lenses. Positive lens 212 has a front surface 212F and a back surface 212B. Front surface 212F may be aspheric and have a smaller radius of curvature than back surface 212B. Negative lens 218 has a front surface 218F and a back surface 218B. Front surface 218F may have a profile that is aspherical or a non-aspherical, e.g., a spherical surface profile. Back surface 218B may be aspheric and have a smaller radius of curvature than front surface 218F. Without departing from the scope of the present embodiments, positive lens 212 and negative lens 218 may be, respectively, a biconvex lens and a biconcave lens. Also without departing from the scope hereof, a gap may exist between positive lens 212 and negative lens 218.

In an embodiment, surfaces 212B and 218F are both spherical and have equal radius of curvature magnitudes. Both surfaces 212B and 218F may be planar. Converging lens 210 may be a doublet lens in which lenses 212 and 218 are formed of either different materials or the same material. One or both of lenses 212 and 218 may include a cured polymer, such as a cyclo olefin polymer, for example, Zeonex® 480R by Zeon Specialty Materials, Inc. Without departing from the scope hereof, converging lens 210 may be a singlet lens having front surface 212F and back surface 218B.

Low-height projector assembly 200 has an aperture stop intersected by an aperture-stop plane 205, which intersects converging lens 210. Aperture-stop plane 205 may be orthogonal to optical axis 215, and may intersect at least one of lenses 212 and 218. Converging lens 210 has an edge surface 210E. In embodiments of converging lens 210 that include lenses 212 and 218, edge surface 210E includes edge surfaces of both lenses 212 and 218. Edge surface 210E may be planar, non-planar, and may include discontinuities, e.g., at an interface between lenses 212 and 218. The intersection of edge surface 210E and surface 212B may define the aperture stop, as shown in FIG. 2.

A diameter of positive lens 212 or negative lens 218 may determine a diameter of the aperture stop located at aperture-stop plane 205. On optical axis 215, aperture-stop plane 205 may be between surfaces 212F and 218B, for example between surfaces 212B and 218B. On optical axis 215, aperture-stop plane 205 may be positioned such that at least part of positive lens 212 is between aperture-stop plane 205 and negative lens 218.

Biconvex lens 230 may be a singlet lens or a compound lens, for example, one including a biplanar substrate between two plano-convex lenses. Biconvex lens 230 has a front surface 231, a back surface 234, an optical axis 235, and a principal plane 236. Beam-steerer 220 enables low-height projector assembly 200 to be relatively compact in a dimension parallel to at least one of optical axes 215 and 235.

FIG. 2 illustrates chief rays 240, marginal rays 241, and marginal rays 242 propagating through low-height projector assembly 200 to a plane 206. Rays 240-242 may propagate from light source 172 located at a plane 202, which may be an object plane or an image plane. Chief rays 240 include an axial chief ray 243, which propagates along both optical axes 215 and 235. Axial chief ray 243 may represent part of light emitted by light source 172. In an embodiment, low-height projector assembly 200 includes light source 172 such that rays 240-243 represent light emitted therefrom at plane 202. An axial chief ray of a lens is a chief ray that propagates along the lens's optical axis.

Low-height projector assembly 200 may be described by parameters typically ascribed to imaging systems. In projection mode of low-height projector assembly 200, rays 240-242 propagate from light source 172 toward aperture-stop plane 205. Low-height projector assembly 200 may be viewed as operating in imaging mode, where rays 240-243 propagate in the opposite direction through assembly 200: from aperture-stop plane 205 to an image surface 203, which is tangential to the plane 202 at optical axis 235. These imaging-system parameters include field curvature and distortion.

Low-height projector assembly 200 may have, via image surface 203, a field curvature magnitude less than 30.0 micrometers as a function of image height at plane 202. The distortion of low-height projector assembly 200 may be less than 0.4 percent as a function of image height at plane 202. Low-height projector assembly 200 may have a depth of focus 208 about plane 202.

Low-height projector assembly 200 may be one-sided telecentric at plane 202. For example, the propagation distance of axial chief ray 243 from principal plane 236 to aperture-stop plane 205 may differ from the focal length of biconvex lens 230 by no more than a tolerance Δz, such that the low-height projector assembly 200 is one-sided telecentric. Tolerance Δz is, for example, one half of the depth of focus of biconvex lens 230 or one half of depth of focus 208 of low-height projector assembly 200 about object plane 202. Rays 240-242 illustrate such one-sided telecentricity between biconvex lens 230 and plane 202. Tolerance Δz may be viewed as a first telecentricity metric.

When low-height projector assembly 200 exhibits ideal telecentricity, each of the three chief rays 240 are normally incident on plane 202. Hence, a second metric for telecentricity is the maximum deviation of chief rays 240 from said normal incidence. For field heights at plane 202 between ±0.10 mm, low-height projector assembly 200 may be one-side telecentric to within 0.10 degrees, which means that for chief rays 240 at plane 202 between ±0.10 mm, the maximum deviation from normal incidence is less than or equal to 0.10 degrees.

Beam-steerer 220 may include a reflector 221 and a reflector 222 having respective front surfaces 223 and 224, each of which may be planar. Each of reflectors 221 and 222 may be either a mirror or a prism. Reflective surface 224 intersects optical axis 235 at an angle 226 and is configured to reflect light transmitted by biconvex lens 230, e.g., rays 240-243, toward reflector 221. Reflective surface 223 of reflector 222 intersects optical axis 215 at an angle 225 and is configured to reflect light, e.g., rays 240-243, received from reflector 222 toward converging lens 210. Optical axes 215 and 235 may be parallel and separated by a distance 237. Each of angles 225 and 226 may be between 40° and 50°, e.g., both angles 225 and 226 may be 45°. On optical axis 235, front surface 231 and reflective surface 224 are separated by a distance 238.

Low-height projector assembly 200 has a height 209. Height 209 is defined by a shortest distance between plane 202 and plane 214. Low-height projector assembly 200 is configured such that axial chief ray 243 propagates an optical path length $OPL_g$ between converging lens 210 and biconvex lens 230. Optical path length $OPL_g$ is, for example, between surfaces 218B and 231 and overlaps both optical axes 215 and 235. The ratio of optical path length $OPL_g$ to a total optical track length OPL is a metric of how large a decrease in height 209 can be achieved by beam-steerer 220. This ratio may satisfy $OPL_g/OPL > 0.6$. Total optical track length OPL is, for example, the optical path of axial chief ray 243 between plane 202 and surface 212F.

Low-height projector assembly 200 has a total track length T between plane 202 and a plane 214. Total track length T equals, for example, the propagation distance of axial chief ray 243 between plane 202 and plane 214 through low-height projector assembly 200, and is independent of the refractive index of lenses 210 and 230. Plane 214 is tangential to front surface 212F at optical axis 215. In an embodiment, height 209 is less than three millimeters. The ratio of height 209 to total track length T is a metric indicating effectiveness of beam-steerer 220 in compacting projector assembly 200. In an embodiment, height 209 is less than 0.7T.

Converging lens 210 may have a focal length that is insensitive to changes in temperature by virtue of material properties of lenses 212 and 218. To this end, positive lens 212 may be formed of a material having a thermo-optic coefficient $$\frac{dn_{212}}{dt} \geq 50 \text{ ppm/K}.$$

Negative lens 218 may be formed of a material having a thermo-optic coefficient $$\frac{dn_{218}}{dt}$$

that is at least two times the absolute value of $$\frac{dn_{212}}{dt}, \text{ e.g.,} \left|\frac{dn_{218}}{dt}\right| \geq 200 \text{ ppm/K}.$$

In an embodiment, $$\frac{dn_{210}}{dt}$$

is between −125 ppm/K and −75 ppm/K, and $$\frac{dn_{218}}{dt}$$

is between −250 ppm/K and −200 ppm/K.

Thermal optical properties of converging lens 210, e.g., temperature dependence of their refractive indices, may enable low-height projector assembly 200 to have a focal length that is insensitive to changes in temperature. For example, when light source 172 has an emitter diameter $D_e$ and low-height projector assembly 200 has a working f-number $N_w$, the change in focal length may be less than $N_w D_e$ as the ambient temperature varies between twenty-five and sixty degrees Celsius.

Figure 3:
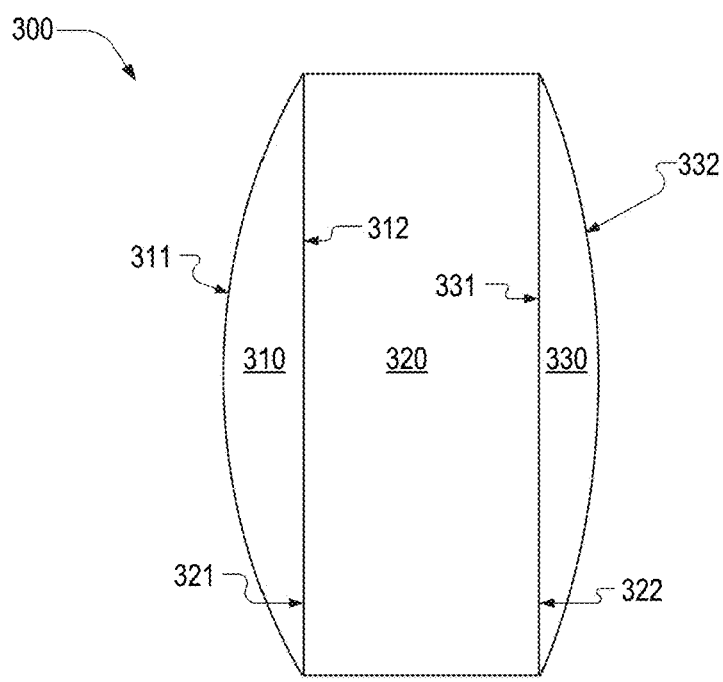
FIG. 3 is a schematic cross-sectional view of a biconvex lens, which is an example of the compound lens of the low-height projector assembly of FIG. 2.

FIG. 3 is a schematic cross-sectional view of a biconvex lens 300, which is an example of biconvex lens 230 of low-height projector assembly 200. Biconvex lens 300 includes plano-convex lenses 310 and 330 and a biplanar substrate 320 therebetween. Plano-convex lens 310 has a convex surface 311 and a planar surface 312. Biplanar substrate 320 has a front surface 321 and a rear surface 322. Plano-convex lens 330 has a planar surface 331 and a convex surface 332. Plano-convex lens 310 may include an optical class, such as FTM16 by Ohara, Inc. Plano-convex lens 330 may include a resin, an optical glass, or any combination thereof. The resin may include a norbornene functional polymer, such as Arton® D4532 by JSR Corporation. The optical glass may include "K4" glass by Schott AG.

Figure 4:
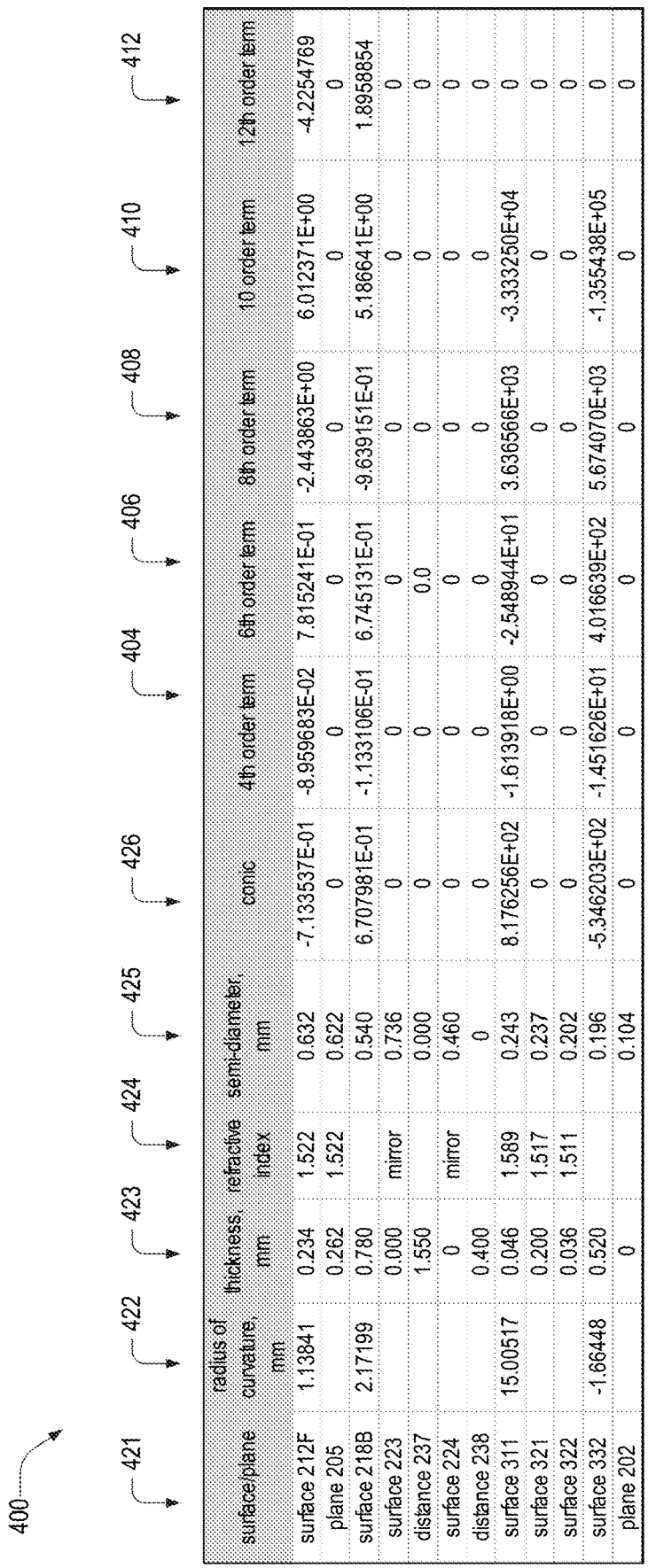
FIG. 4 shows a first table of exemplary parameters of the low-height projector assembly of FIG. 2.

FIG. 4 depicts a table 400 of exemplary parameters of surfaces and substrates of a first embodiment of low-height projector assembly 200, where biconvex lens 300 functions as biconvex lens 230. Table 400 includes columns 404, 406, 408, 410, 412, and 421-426. Column 421 denotes surfaces of low-height projector assembly 200. In this example of projector assembly 200, converging lens 210 is a doublet lens and, on optical axis 215, aperture-stop plane 205 is between surfaces 212F and 218B.

Column 423 includes thickness values, such as distances 237 and 238, between adjacent surfaces of low-height projector assembly 200 on optical axes 215 and 235. The sum of distances in column 423 equals the total track length T. In this first embodiment of low-height projector assembly 200, both angles 225 and 226 equal 45°. Column 425 indicates the minimum diameter of each surface sufficient for a ray incident on front surface 212F that passes through the aperture stop of aperture-stop plane 205 to also pass through that surface.

Non-planar surfaces of table 400 are defined by surface sag $z_{sag}$, shown in Eqn. 1.

$$z_{sag} = \frac{R^{-1}r^2}{1 + \sqrt{1 - (1+k)R^{-2}r^2}} + \sum_{i=2}^{N} \alpha_{2i} r^{2i} \quad (1)$$

In Eqn. 1, $z_{sag}$ is a function of radial coordinate r, where directions z and r are, respectively, parallel to and perpendicular to, at least one of optical axes 215 and 235. Quantity i is a positive integer and N=6. In Eqn. 1, the parameter R is the surface radius of curvature, listed in column 422 of table 400. Parameter k denotes the conic constant, shown in column 426. Columns 404, 406, 408, 410, 412, and 414 contain values of aspheric coefficients $\alpha_4$, $\alpha_6$, $\alpha_8$, $\alpha_{10}$, and $\alpha_{12}$ respectively. The units of quantities in table 400 are consistent with $z_{sag}$ in Eqn. 1 being expressed in millimeters.

Column 424 lists values of material refractive index at free-space wavelength $\lambda_0$=940 nm. The refractive index corresponding to a surface characterizes the material between the surface and the surface in the row beneath. For example, the refractive index between surfaces 311 and 321 is 1.589, which, in this embodiment, is the refractive index of plano-convex lens 310.

In the low-height projector assembly 200 corresponding to table 400, the optical path length $OPL_g$ between surfaces 218B and 311 is 2.73 millimeters. The total optical path length OPL between surfaces 212F and 332 is 4.44 millimeters, such that $OPL_g/OPL$=0.616. In the low-height projector assembly 200 corresponding to table 400, total track length T equals 4.029 millimeters and height 209 equals 2.472 millimeters, or 0.61T.

The low-height projector assembly 200 corresponding to table 400 is one-side telecentric within a tolerance of 0.0730°. That is, axial chief ray 243 is normally incident at plane 202, while non-axial chief rays 240, reaching plane 202 at field heights between ±0.1 mm, deviate from normal incidence by at most 0.0730°.

FIG. 5 depicts a table 500 of exemplary parameters of surfaces and substrates of a second embodiment of low-height projector assembly 200, where biconvex lens 300 functions as biconvex lens 230. Table 500 includes column 421 of table 400, and also includes columns 504, 506, 508, 510, 512, and 522-526. In this example of projector assembly 200, converging lens 210 is a doublet lens and, on optical axis 215, aperture-stop plane 205 is between surfaces 212F and 218B.

Column 523 includes thickness values, such as distances 237 and 238, between adjacent surfaces of low-height projector assembly 200 on optical axes 215 and 235. In this second embodiment of low-height projector assembly 200, both angles 225 and 226 equal 45°. Non-planar surfaces of table 500 are defined by surface sag $z_{sag}$ of Eqn. 1, where columns 504, 506, 508, 510, 512, and 514 contain values of aspheric coefficients $\alpha_4$, $\alpha_6$, $\alpha_8$, $\alpha_{10}$, and $\alpha_{12}$ respectively.

In the low-height projector assembly 200 corresponding to table 500, the optical path length $OPL_g$ between surfaces 218B and 311 is 2.90 millimeters. The total optical path length OPL between surfaces 212F and 332 is 4.67 millimeters, such that $OPL_g/OPL$=0.621. In the low-height projector assembly 200 corresponding to table 500, total track length T equals 4.245 millimeters and height 209 equals 2.692 millimeters, or 0.62T.

The low-height projector assembly 200 corresponding to table 400 is one-side telecentric within a tolerance of 0.0401°. That is, axial chief ray 243 is normally incident at plane 202, while non-axial chief rays 240, reaching plane 202 at field heights between ±0.1 mm, deviate from normal incidence by at most 0.0401°.

A thermal-sensitivity metric for low-height projector assembly 200 is its change of focal length in response to a substantial temperature range. A criterion for good thermal stability is when this focal length change $\Delta f$ is less than the product of the lens's working f-number $N_w$ and a diameter $D_e$ of a VCSEL, e.g., of light source 172, FIG. 1. Diameter $D_e$ is 6.0 µm, for example. For the low-height projector assembly 200 corresponding to table 400, $N_w=2.67$ and $\Delta f<7.8$ µm over a temperature range between 25° C. and 60° C. When $D_e=6.0$ µm, product $N_w D_e$ exceeds $\Delta f$ by more than a factor of two. For the low-height projector assembly 200 corresponding to table 500, $N_w=2.70$ and $\Delta f<7.0$ µm over a temperature range between 25° C. and 60° C. When $D_e=6.0$ µm, product $N_w D_e$ exceeds $\Delta f$ by more than a factor of two.

Embodiments of low-height projector assembly 200 that are a one-sided telecentric may provide the benefit of low distortion of structured illumination 179 projected onto face 192, when low-height projector assembly 200 is implemented in structured-light projector 170 in FIG. 1. In the low-height projector assemblies 200 corresponding to table 400 and table 500, the maximum distortion as a function of image height at plane 202 is less than 0.5% and 0.3% respectively. The corresponding maximum field curvature for each of these low-height projector assemblies 200 is less than 0.03 millimeters.

Combinations of Features

Features described above as well as those claimed below may be combined in various ways without departing from the scope hereof. The following examples illustrate some possible, non-limiting combinations:

(A1) denotes a low-height projector assembly that includes a biconvex lens, a converging lens, an aperture stop, and a beam-steerer located between the biconvex lens and the converging lens. The biconvex lens has a principal plane, a focal length with respect thereto, and a first optical axis. The focal length has an associated depth of focus. The converging lens has a second optical axis laterally offset from the first optical axis. The beam-steerer is configured to steer light from the biconvex lens to the converging lens such that an axial chief ray, propagating from an object plane through the biconvex lens and along the first optical axis toward the beam-steerer, propagates along the second optical axis toward the converging lens. The aperture stop is intersected by an aperture-stop plane that intersects the second optical axis. On the second optical axis, at least one of a front surface and a back surface of the converging lens is between the aperture-stop plane and the beam-steerer. A propagation distance of the axial chief ray from the principal plane to the aperture stop differs from the focal length by less than half the depth of focus, such that the low-height projector assembly is one-sided telecentric.

(A2) In the low-height projector assembly denoted by (A1), the beam-steerer may include (i) a first reflector intersecting the first optical axis and configured to reflect light received from the biconvex lens, and (ii) a second reflector intersecting the second optical axis and configured to reflect light received from the first reflector toward the converging lens.

(A3) In any low-height projector assembly denoted by one of (A1) and (A2), a ratio of optical path length $OPL_g$ between the converging lens and the biconvex lens to a total optical path length OPL of the low-height projector assembly may satisfy $OPL_g/OPL>0.6$.

(A4) In any low-height projector assembly denoted by one of (A1) though (A3), a distance between the object plane and a plane tangential to the converging lens at the second optical axis may be less than 3.0 millimeters.

(A5) In any low-height projector assembly denoted by one of (A1) though (A4), the converging lens having a first surface facing away from the beam-steerer, a height between the object plane and a plane tangential to the first surface at the second optical axis may be less than seven-tenths of a total track length of the low-height projector assembly.

(A6) Any low-height projector assembly denoted by one of (A1) though (A5) may have a field curvature magnitude less than 0.03 millimeters across a field.

(A7) Any low-height projector assembly denoted by one of (A1) though (A6) may have a distortion less than 0.4 percent across a field.

(A8) In any low-height projector assembly denoted by one of (A1) though (A7), the converging lens may be a doublet lens that includes a diverging lens element adjoining a converging lens element at respective surfaces thereof.

(A9) In any low-height projector assembly denoted by (A8), the respective surfaces may each be spherical surfaces.

(A10) In any low-height projector assembly denoted by one of (A8) and (A9), the aperture stop may be located between the diverging lens elements and the converging lens element.

(A11) Any low-height projector assembly denoted by one of (A1) through (A10) may include a light source configured to emit light propagating parallel to the first optical axis toward the biconvex lens, the biconvex lens being between the light source and the beam-steerer.

(B1) denotes a structured-light projector that includes a diffractive optical element, a light source, and a projector assembly. The diffractive optical element is configured to produce structured illumination from illumination incident thereon. The light source is configured to generate the incident illumination. The projector assembly is (i) located at least partially between the light source and the diffractive optical element, (ii) one-sided telecentric proximate the diffractive optical element, and (iii) configured to project the incident illumination onto the diffractive optical element.

(B2) In any structured-light projector denoted by (B1), projector assembly may be any of the low-height projector assemblies denoted by one of (A1) through (A11).

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated, the adjective "exemplary" means serving as an example, instance, or illustration. The following claims are intended to cover all generic and specific features described herein, as well as all statements of the scope of the present method and system, which, as a matter of language, might be said to fall therebetween.

What is claimed is:

1. A low-height projector assembly comprising:
a biconvex lens having a principal plane, a focal length with respect thereto, a depth of focus associated with the focal length, and a first optical axis;
a converging lens having a second optical axis laterally offset from the first optical axis;
a beam-steerer, located between the biconvex lens and the converging lens, configured to steer light from the biconvex lens to the converging lens such that an axial chief ray, propagating from an object plane through the biconvex lens and along the first optical axis toward the beam-steerer, propagates along the second optical axis toward the converging lens; and an aperture stop intersected by an aperture-stop plane that intersects the second optical axis, and on the second optical axis, at least one of a front surface and a back surface of the converging lens being between the aperture-stop plane and the beam-steerer;

a propagation distance of the axial chief ray from the principal plane to the aperture stop differing from the focal length by less than half the depth of focus, such that the low-height projector assembly is one-sided telecentric.

2. The low-height projector assembly of claim 1, the beam-steerer comprising:
   a first reflector intersecting the first optical axis and configured to reflect light received from the biconvex lens; and
   a second reflector intersecting the second optical axis and configured to reflect light received from the first reflector toward the converging lens.

3. The low-height projector assembly of claim 1, a ratio of an optical path length $OPL_g$ between the converging lens and the biconvex lens to a total optical path length $OPL$ of the low-height projector assembly satisfying $OPL_g/OPL > 0.6$.

4. The low-height projector assembly of claim 1, a distance between the object plane and a plane tangential to the converging lens at the second optical axis being less than 3.0 millimeters.

5. The low-height projector assembly of claim 1, the converging lens having a first surface facing away from the beam-steerer, height between the object plane and a plane tangential to the first surface at the second optical axis being less than seven-tenths of a total track length of the low-height projector assembly.

6. The low-height projector assembly of claim 1, having a field curvature magnitude less than 0.03 millimeters across a field.

7. The low-height projector assembly of claim 1, having a distortion less than 0.4 percent across a field.

8. The low-height projector assembly of claim 1, the converging lens being a doublet lens that includes a diverging lens element adjoining a converging lens element at respective surfaces thereof.

9. The low-height projector assembly of claim 8, the respective surfaces each being spherical surfaces.

10. The low-height projector assembly of claim 9, the aperture stop being located between the diverging lens element and the converging lens element.

11. The low-height projector assembly of claim 1, further comprising a light source configured to emit light propagating parallel to the first optical axis toward the biconvex lens, the biconvex lens being between the light source and the beam-steerer.

12. A low-height projector assembly comprising:
   a biconvex lens having a principal plane, a focal length with respect thereto, a depth of focus associated with the focal length, and a first optical axis;
   a converging lens having a second optical axis laterally offset from the first optical axis;
   a beam-steerer, located between the biconvex lens and the converging lens, configured to steer light from the biconvex lens to the converging lens such that an axial chief ray, propagating from an object plane through the biconvex lens and along the first optical axis toward the beam-steerer, propagates along the second optical axis toward the converging lens; and
   an aperture stop intersected by an aperture-stop plane that intersects the second optical axis, and on the second optical axis, at least one of a front surface and a back surface of the converging lens being between the aperture-stop plane and the beam-steerer;
   a propagation distance of the axial chief ray from the principal plane to the aperture stop differing from the focal length by less than half the depth of focus, such that the low-height projector assembly is one-sided telecentric;
   a ratio of an optical path length $OPL_g$ between the converging doublet lens and the biconvex lens to a total optical path length $OPL$ of the low-height projector assembly satisfying $OPL_g/OPL > 0.6$;
   the converging lens having a first surface facing away from the beam-steerer, height between the object plane and a plane tangential to the first surface at the second optical axis being less than seven-tenths of a total track length of the low-height projector assembly.

13. A structured-light projector comprising:
   a diffractive optical element configured to produce structured illumination from incident illumination;
   a light source configured to generate the incident illumination; and
   a projector assembly that (i) is located at least partially between the light source and the diffractive optical element, (ii) is one-sided telecentric proximate the diffractive optical element, (iii) is configured to project the incident illumination onto the diffractive optical element, and (iv) includes:
     a biconvex lens having a principal plane, a focal length with respect thereto, a depth of focus associated with the focal length, and a first optical axis;
     a converging lens having a second optical axis laterally offset from the first optical axis;
     a beam-steerer, located between the biconvex lens and the converging lens, configured to steer light from the biconvex lens to the converging lens such that an axial chief ray, propagating from an object plane through the biconvex lens and along the first optical axis toward the beam-steerer, propagates along the second optical axis toward the converging lens; and
     an aperture stop intersected by an aperture-stop plane that intersects the second optical axis, and on the second optical axis, at least one of a front surface and a back surface of the converging lens being between the aperture-stop plane and the beam-steerer;
     a propagation distance of the axial chief ray from the principal plane to the aperture stop differing from the focal length by less than half the depth of focus, such that the low-height projector assembly is one-sided telecentric.

* * * * *